(12) United States Patent
Clouse et al.

(10) Patent No.: US 6,375,410 B2
(45) Date of Patent: Apr. 23, 2002

(54) FRANGIBLE COVER FOR TURBOFAN ENGINE BLADE REMOVAL AND ACCESS

(75) Inventors: Brian Ellis Clouse, Saugus; Robert Armstrong Morse, Amesbury, both of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/758,352

(22) Filed: Jan. 12, 2001

Related U.S. Application Data

(60) Provisional application No. 60/180,617, filed on Feb. 7, 2000.

(51) Int. Cl.[7] ........................... F01D 21/00; F01D 25/24
(52) U.S. Cl. ........................... 415/9; 415/200; 415/201
(58) Field of Search ........................... 415/9, 200, 201, 415/118, 173.4

(56) References Cited

U.S. PATENT DOCUMENTS

| | | | |
|---|---|---|---|
| 2,851,214 A | 9/1958 | Busquet | 230/120 |
| 3,016,227 A | 1/1962 | Lawrence et al. | 253/78 |
| 3,176,960 A | 4/1965 | Sproule | 253/148 |
| 4,693,677 A | 9/1987 | Shigemoto et al. | 425/376 R |
| 4,734,007 A | 3/1988 | Perry | 415/9 |
| 5,622,472 A | 4/1997 | Glowacki | 415/9 |

*Primary Examiner*—F. Daniel Lopez
*Assistant Examiner*—Kimya N McCoy
(74) *Attorney, Agent, or Firm*—Nathan D. Herkamp; B. Joan Haushalter

(57) ABSTRACT

A frangible cover is provided for a recess in a containment case for turbofan engine blade removal and access. The recess provided in the containment case allows outward radial movement of the engine fan blade when the engine fan blade is to be removed from the containment case. The present invention proposes a frangible component to cover the recess. A plurality of initiation points, notched in the frangible cover at intersections of surfaces encourages brittle fracture of the frangible component.

12 Claims, 3 Drawing Sheets

FRANGIBLE COVER FOR TURBOFAN ENGINE BLADE REMOVAL AND ACCESS

This application claims priority to the co-pending provisional patent application filed Feb. 7, 2000, Ser. No. 60/180,617.

BACKGROUND OF THE INVENTION

The present invention relates to an improved cover for a turbofan engine blade of a gas turbine engine.

Some turbofan aircraft engines have a fan blade design that requires outward radial movement of the fan blade. That is, a fan blade pin pinning the blade in place has to be removed to allow removal of the fan blade. The blade then has to be moved out from the engine centerline before it can be removed from the engine. A recess or pocket is required in the structural containment fan case to allow such blade removal. This recessed pocket or blade port must have a removable cover to maintain a smooth flowpath surface on the inside diameter of the containment case. In the existing art, this blade port cover is typically made of cast aluminum, with threaded inserts to facilitate installation.

Unfortunately, the blade port and cover can have a deleterious effect during a fan blade failure. The blade port area forms a hard and massive feature. This feature behaves differently from the remainder of the containment case. If a fragment of a broken fan blade impacts this area, it decelerates more quickly and has a greater chance of impacting other fan blades, increasing the probability that they will fail as well. Further, the cover can readily be torn off by such an impact, becoming an unrestrained mass that can cause additional damages to other blades upon impact.

It would be desirable, then, to provide an improved structure for the blade port area of a turbofan aircraft engine.

BRIEF SUMMARY OF THE INVENTION

To improve the existing cover structure, a frangible material is proposed for forming the body of the blade port cover. Additionally, a geometric design can be applied to the cover, incorporating multiple small-radius inside corners to act as initiation points for brittle fracture.

Accordingly, the present invention provides an improved structure for forming the blade port area of a turbofan aircraft engine.

DETAILED DESCRIPTION OF THE INVENTION

Figure 1:
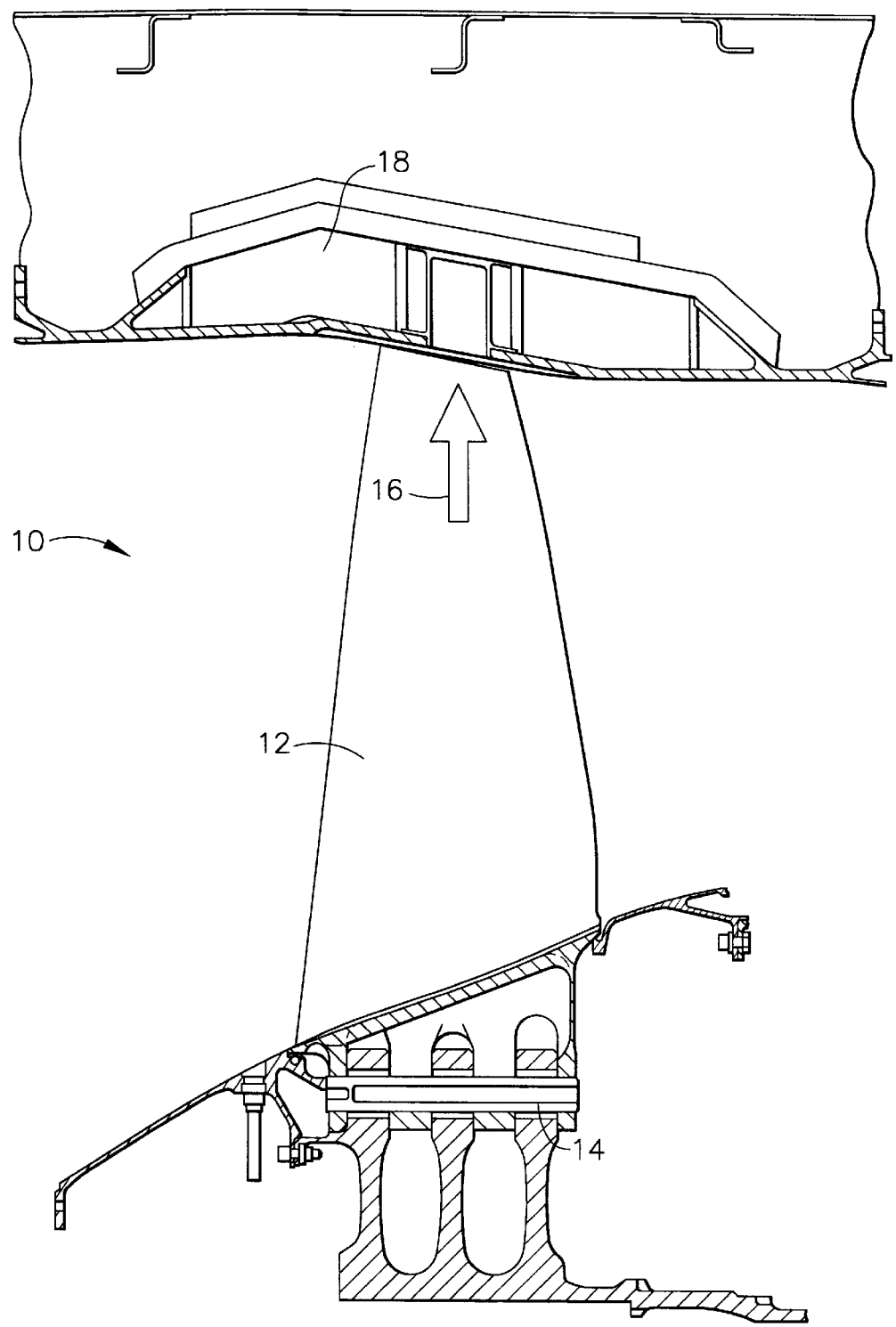
FIG. 1 illustrates a partial structural view of a turbofan aircraft with engine fan blades and associated containment cases.
Figure 2:
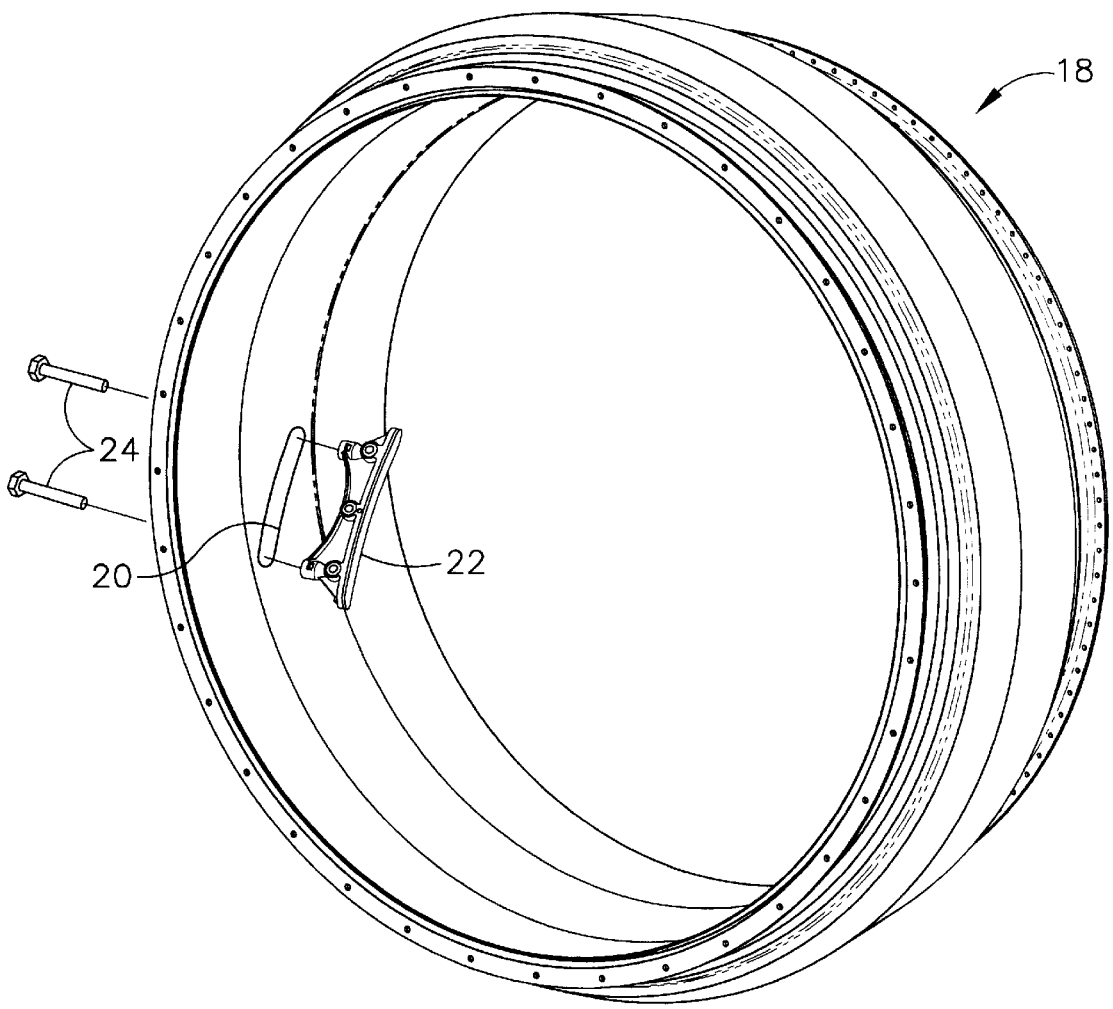
FIG. 2 illustrates a fan blade containment case with the frangible cover.
Figure 3:
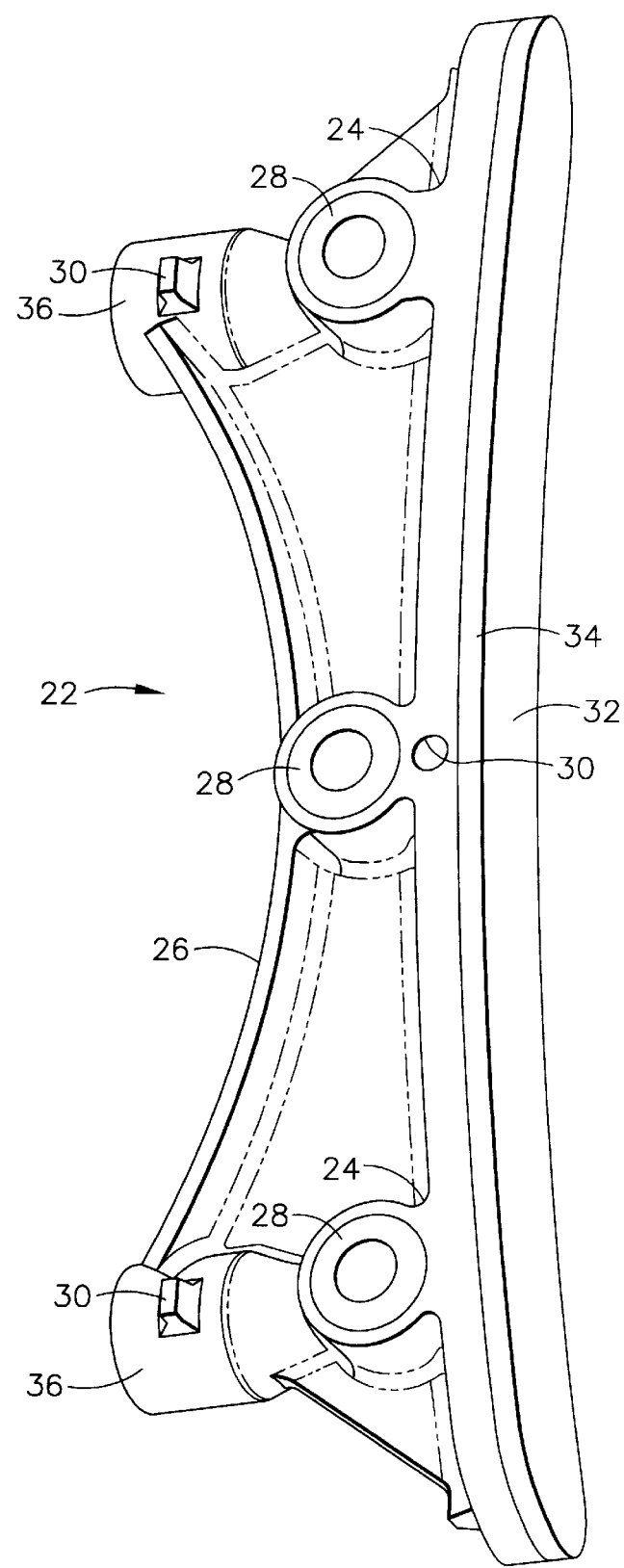
FIG. 3 is a more detailed view of the frangible cover structure of the invention.

Referring to FIG. 1, there is a partial structural illustration of a turbofan aircraft engine 10. In certain engine structures, such as is illustrated in FIG. 1, the fan blade cannot be slid out without modification to the structure. Fan blade(s) 12 associated with the engine are pinned in place with pin(s) in area 14. Pin 14 is removed when fan blade 12 is to be removed. This requires the fan blade 12 to move radially outward in the direction of arrow 16. However, the containment case 18 would prevent such radial outward movement, so a recess 20, shown in FIG. 2, is incorporated into the fan case 18. A frangible component 22, best illustrated in FIG. 3, covers the recess 20. Cover attachment bolts 24 can be inserted through the surface of the fan case 18 to secure the cover 22 over the recess 20.

In the existing art, this cover 22 has typically been made of cast aluminum. However, the present invention proposes a frangible polymer material for forming the body of the blade port cover 22. An example of a suitable material is polyetheretherketone (PEEK) with glass or carbon reinforcing. The frangible material of cover 22 has the strength and fatigue properties to function as required, but has much lower density, and therefore mass, than a comparable cast aluminum part.

In the fabrication of cover 22, required part stiffness is maintained by adding an arched member 26 between the two attachment locations of the cover, since plastic material is inherently less stiff than aluminum. The support member 26 is also, preferably, a frangible material, and is arched along a generally longitudinal length of the frangible component 22. The balance of strength and stiffness prevents vibration at a frequency that will activate the structure, yet still encourages the brittleness provided by the invention. Multiple anti-vibration bumpers 28 can be employed to reduce the vibrational stresses in the cover 22.

The use of fiber reinforcing makes the material brittle, reducing the impact force required to fracture it. The addition of fibers also increases the material modulus, which, in turn, increases the part stiffness. For improved control during fabrication, machining datums 30 can be used. These datums also provide a mechanical feature, which assures proper assembly alignment of the cover. The lower mass of a liberated cover means that the stress on a fan blade that may strike the cover is lower. This reduces the probability of the blade 12 fracturing and causing possible further engine damage.

In a further embodiment of the frangible cover, a geometric design can be applied to the cover 22. The geometric design is comprised of multiple small-radius inside corners 24. The small-radius can be applied to inside corners at any one or more locations where there is an intersection of two surfaces. The small-radius corners act as initiation points 24 to encourage brittle fracture. The use of these corners or integral notches 24 helps to ensure that the cover 22 will break up easily when impacted by a failed fan blade fragment.

Continuing with FIG. 2, removable cover 22 allows a smooth flowpath along surface 32 to be maintained on the inside diameter of the containment case 18. The frangible plastic structure 22 is comprised of an abradable material 34 to permit a tight clearance between the fan blade tips and the casing. The tight clearance is desired for performance, and the abradable material is a sacrificial material that can be rubbed by the fan blade tip without damaging the structure. Finally, threaded inserts inside components 36 allow for installation of the cover 22 to the containment case 18, as illustrated in FIG. 2.

While the invention has been described with reference to a preferred embodiment, it will be understood by those skilled in the art that various changes may be made and equivalents may be substituted for elements thereof without departing from the scope of the invention. For example, this design can be applied in various environments to various components. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a containment case for a fan blade of a turbofan engine, a fan blade removal and access structure comprising:

a recess in the containment case for allowing outward radial movement of the engine fan blade when the engine fan blade is to be removed from the containment case; and a frangible component to cover the recess.

2. A fan blade removal and access structure as claimed in claim 1 wherein the frangible component comprises a frangible support element to provide stiffness to the frangible component.

3. A fan blade removal and access structure as claimed in claim 2 wherein the frangible support element comprises an arched element along a longitudinal length of the frangible component.

4. A fan blade removal and access structure as claimed in claim 1 wherein the frangible component comprises a polyetheretherketone material.

5. A fan blade removal and access structure as claimed in claim 4 wherein the polyetheretherketone material comprises fiber reinforcing to contribute to brittleness of the frangible component.

6. A fan blade removal and access structure as claimed in claim 1 further comprising initiation points for brittle fracture.

7. A fan blade removal and access structure as claimed in claim 6 wherein the initiation points comprise a plurality of small-radius inside corners at surface intersections.

8. In a containment case for a fan blade of a turbofan engine, a fan blade removal and access structure comprising:

a recess in the containment case for allowing outward radial movement of the engine fan blade when the engine fan blade is to be removed from the containment case;

a frangible component to cover the recess; and a plurality of initiation points to encourage brittle fracture of the frangible component.

9. A fan blade removal and access structure as claimed in claim 8 wherein the frangible component comprises a frangible support element to provide stiffness to the frangible component.

10. A fan blade removal and access structure as claimed in claim 9 wherein the frangible support element comprises an arched element along a longitudinal length of the frangible component.

11. A fan blade removal and access structure as claimed in claim 8 wherein the frangible component comprises a polyetheretherketone material.

12. A fan blade removal and access structure as claimed in claim 11 wherein the polyetheretherketone material comprises fiber reinforcing to contribute to brittleness of the frangible component.

* * * * *